United States Patent [19]

Wheeler et al.

[11] Patent Number: 5,066,149
[45] Date of Patent: Nov. 19, 1991

[54] SPLICE TRAY WITH SLACK TAKE-UP

[75] Inventors: Todd Wheeler, Hudson, Wis.; Wayne A. Johnson, Rosemount, Minn.

[73] Assignee: ADC Telecommunications, Inc., Minneapolis, Minn.

[21] Appl. No.: 580,769

[22] Filed: Sep. 11, 1990

[51] Int. Cl.[5] .............................................. G02B 6/36
[52] U.S. Cl. .................................................... 385/135
[58] Field of Search ..................................... 350/96.20

[56] References Cited

U.S. PATENT DOCUMENTS

| 4,792,203 | 12/1988 | Nelson et al. | 350/96.20 |
|---|---|---|---|
| 4,820,007 | 4/1989 | Ross et al. | 350/96.20 |
| 4,840,449 | 6/1989 | Ghandeharizadeh | 350/96.20 |
| 4,995,688 | 2/1991 | Anton et al. | 350/96.20 |

Primary Examiner—Georgia Epps
Attorney, Agent, or Firm—Merchant, Gould, Smith, Edell, Welter & Schmidt

[57] ABSTRACT

A splice cabinet is disclosed having a chassis with a plurality of drawers slidably mounted in the chassis. Each of the drawers has a splice tray and a take-up spool slidably mounted on the drawer.

4 Claims, 4 Drawing Sheets

SPLICE TRAY WITH SLACK TAKE-UP

BACKGROUND OF THE INVENTION

1. Field of the Invention

This invention pertains to optical fiber data and voice transmission apparatus. More particularly, this invention pertains to a splice module for optical fibers where the module has a slack take-up.

2. Description of the Prior Art

The use of optical fiber transmission in the telecommunications industries has greatly expanded. Responding to the rapid increase, the industry has designed and developed various distribution frames and other apparatus for connecting and coordinating optical fibers. An example of such a distribution frame for use with optical fibers is shown in the commonly assigned co-pending U.S. patent application Ser. No. 07/388,060 filed July 31, 1986 now U.S. Pat. No. 4,995,688.

The aforementioned patent application teaches a splice module which includes a chassis having a plurality of drawers slidably mounted within the chassis. Each of the drawers may carry up to two splice trays utilized for effecting splices between optical fibers. In use, an operator pulls the drawer out of the chassis to have access to the splice tray. When the drawer is slid back into the chassis, optical fiber which has been drawn into the drawer cannot readily exit the chassis. Accordingly, excess fiber is retained within a drawer. As the drawer is closed, it is possible the fiber may bend to such a degree that the fiber may be damaged.

It is an object of the present invention to provide a splice module which includes means for preventing damage to an optical fiber contained within the drawer and accommodating excess fiber.

SUMMARY OF THE INVENTION

According to a preferred embodiment of the present invention, a splice cabinet is provided comprising a chassis having a plurality of drawers slidably mounted within the chassis. The drawers are slidable between an in position with the drawers fully retained within the chassis and an out position with the drawers individually slidable out of the chassis. Each of the drawers carries up to two splice trays for splicing optical fibers.

Fiber is admitted through the back of the chassis into the rear of the drawers. A take-up wheel is provided with each drawer which is slidable toward the rear of the drawer as the drawer is pulled out and slidable toward the front of the drawer as the drawer is pushed into the chassis. The take-up wheel accommodates excess fiber while retaining the fiber in a radius of curvature greater than a minimum radius which would otherwise damage optical fibers. dr

DESCRIPTION OF THE PREFERRED EMBODIMENT

Figure 1:
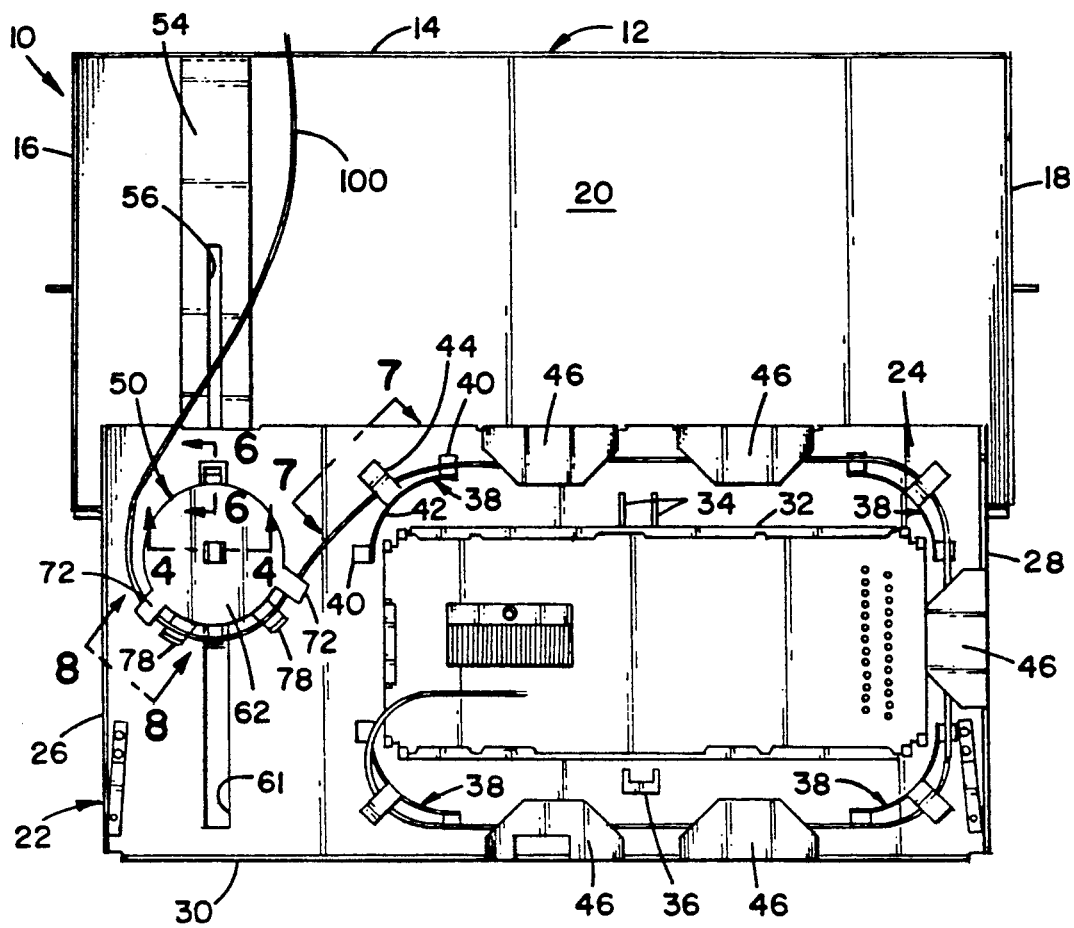
FIG. 1 is a top plane view of a splice module according to the present invention showing a drawer in a fully extended position.

Referring now to the several drawing figures in which identical elements are numbered identically, a splice module 10 according to the present invention is shown. The module 10 includes a chassis 12 having a back wall 14 and spaced apart sidewalls 16,18. The chassis 12 also includes top and bottom walls which are not shown in the figures for the purpose of convenience of illustration. However, the chassis may be of similar construction to that of a splice module shown in U.S. Pat. No. 4,995,688.

The walls of the chassis define a chassis interior 20. Disposed within the interior in overlying relation are a plurality of splice drawers 22. Each drawers 22 is identical. Accordingly, only one drawer 22 is shown.

Drawer 22 is slidable between a fully extended position (shown in FIG. 1 with the drawer pulled out of interior 20) and a fully inserted position (shown in FIG. 2) with the drawer fully inserted within interior 20. It will be appreciated that means for slidably mounting a drawer in a splice module chassis are known in the art and are shown in the aforementioned U.S. Pat. No. 4,995,688.

Drawer 22 is formed of sheet metal and includes a bottom plate 24 and spaced apart side flanges 26,28. A leading edge of drawer 22 is provided with an upwardly projecting flange 30.

A splice tray 32 (shown in FIGS. 1 and 2) is provided for effecting splices between optical fiber pairs. Splice trays such as tray 32 are known in the art and are commercially available items which form no part of this invention per se.

Figure 7:
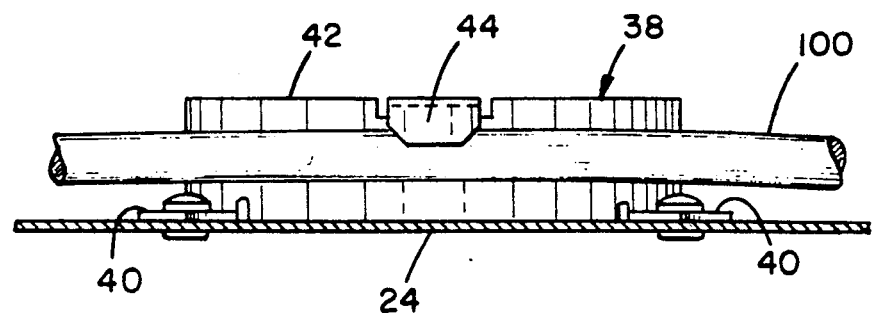
FIG. 7 is a view taken along line 7—7 of FIG. 1.
Figure 8:
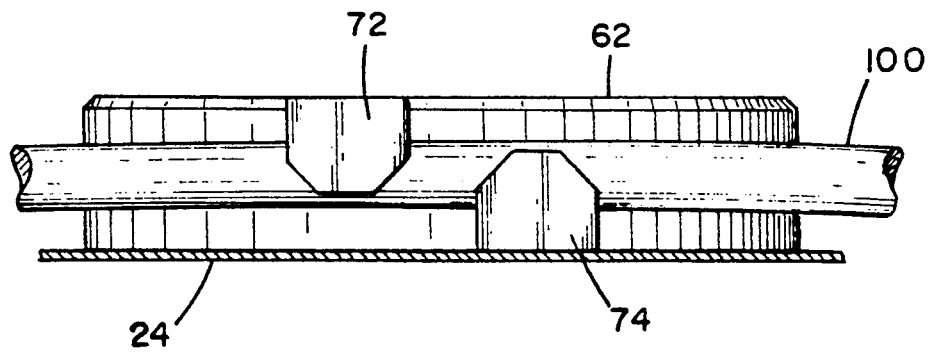
FIG. 8 is a view taken along line 8—8 of FIG. 1.

Tray 32 is held on surface 24 and may be retained in place by an elastic band (not shown) carried over retaining clips 34,36. Surrounding tray 32 at each of its corners are radius limiting brackets 38. Shown more fully in FIG. 7, each of brackets 38 includes mounting tabs 40 for attachment to bottom plate 24 and an arcuate wall 42. Wall 42 is selected to have a radius of curvature greater than a predetermined minimum radius which would otherwise result in damage to an optical fiber bent sharper than the minimum radius. Preferably the radius is about 1½". A retaining clip 44 which extends from the top of the wall 38 outwardly away from the convex surface of wall 42. The clips 38 are positioned with the concave surface of the walls 42 opposing the corners of the splice tray 32.

Surrounding the splice tray 32 are a plurality of retaining clips 46 formed in the sheet metal of drawer 22. The clips 46 bend inwardly over an opposing plate 24. The clips do not cover tray 32 so that a tray 32 may be removed from drawer 22 without interference by clips 46.

Figure 3:
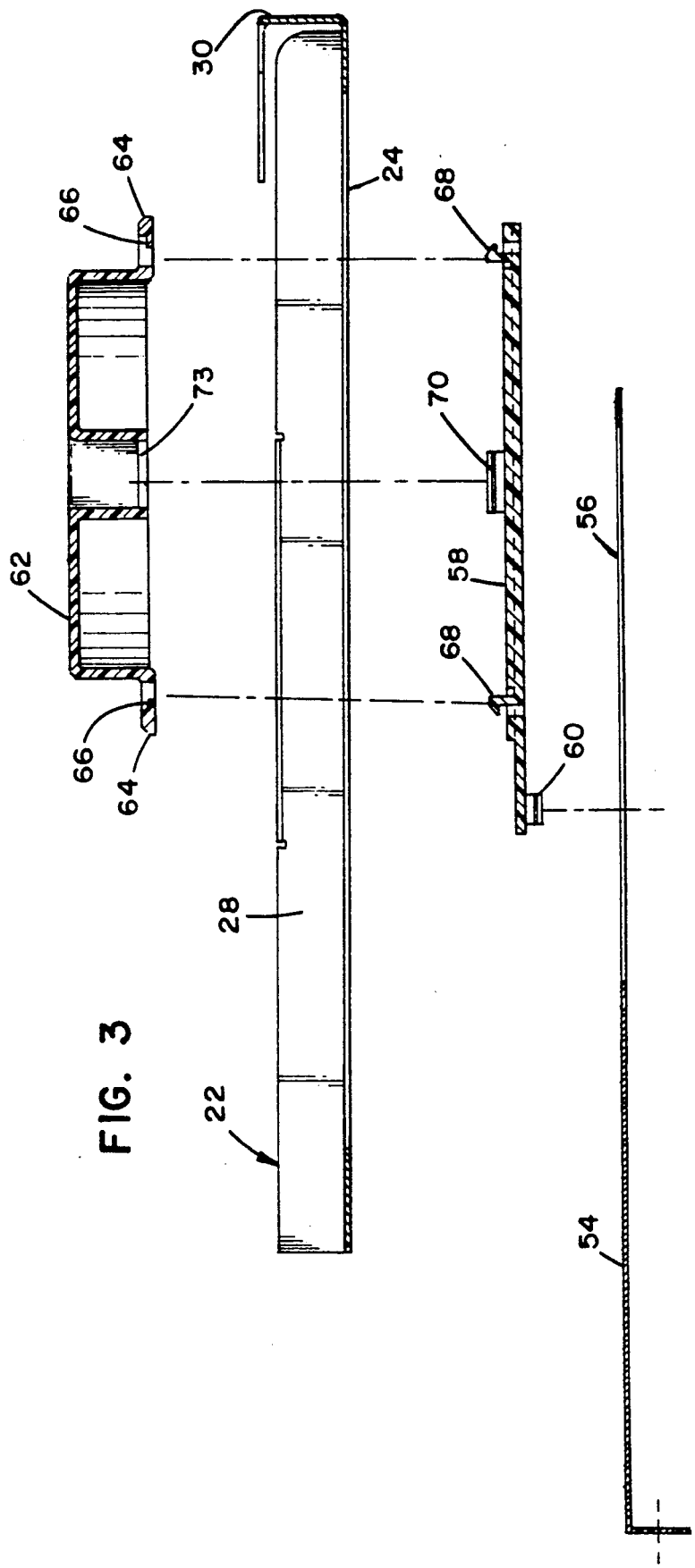
FIG. 3 is an exploded side elevation view, shown partially in section, showing a slide wheel for use with the present invention.
Figure 4:
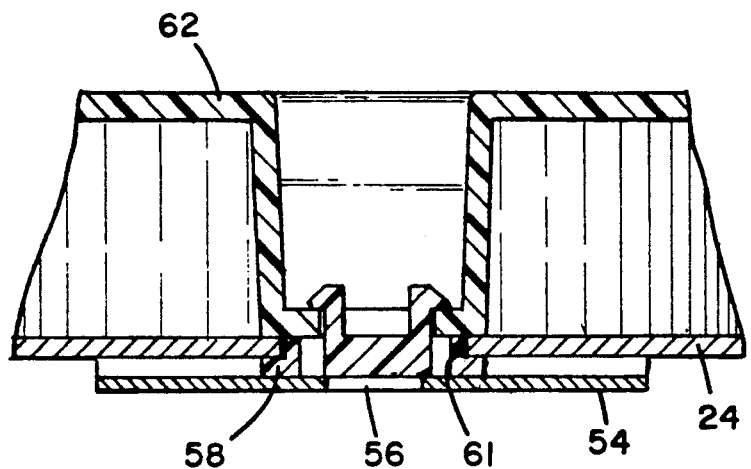
FIG. 4 is a view taken along line 4—4 of FIG. 1.
Figure 5:
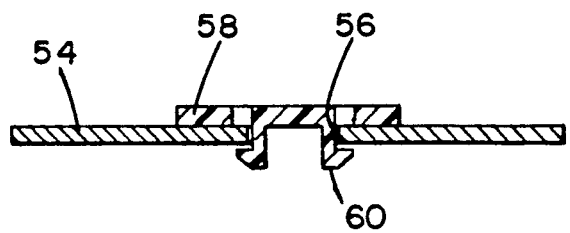
FIG. 5 is a view taken along line 5—5 of FIG. 3.
Figure 6:
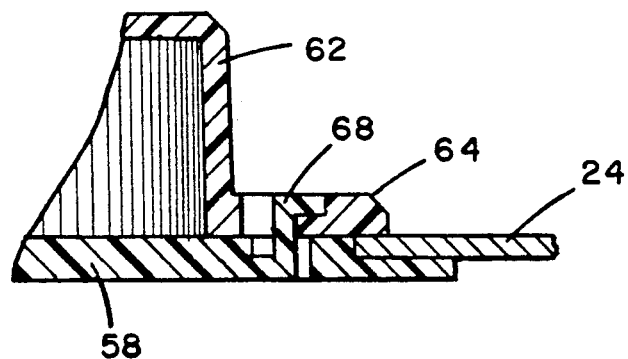
FIG. 6 is a view taken along line 6—6 of FIG. 1.

A sliding push mechanism (or take-up wheel) 50 is provided for taking up excess fiber within a drawer 22 while retaining and preventing a fiber from bending to a degree which would otherwise damage the optical fiber. Push mechanism 50 includes a spool or wheel 62 slidably received on a slide plate 54. Plate 54 is disposed beneath bottom plate 24 and extends from rear wall 14 toward the leading edge of the drawer 22 (see FIG. 3). Running from the mid point of slide plate 54 toward the leading edge of plate 54 is a slot 56.

A slide bar 58 having a clip 60 formed on a trailing end of its bottom surface (see FIG. 3) is slidably received on slide plate 54 with clips 60 snapped within slot 56 to retain bar 58 on plate 54. A slot 61 is formed in plate 24 and sized and positioned to cover slide plate 54. Slide bar 58 is sized to be freely received and slidable within slide plate slot 61.

Wheel 62 is generally cylindrical and is provided with front and rear flanges 64 (FIG. 3) with openings 66 formed therethrough. Clips 68 extend upwardly from slide bar 58 and are positioned to be snapped within recesses 66 to secure wheel 62 to slide bar 58. A centrally located clip 70 is disposed to be received within a centrally located clip receiving opening 73. Cylindrical wheel 62 is positioned above base plate 24 such that wheel 62 slides along the longitudinal length of slot 61 relative to drawer 22. The diameter of wheel 62 is selected to have a radius of curvature greater than the minimum radius which would otherwise result in possible damage to an optical fiber. Preferably, the radius is about 1½".

The wheel 62 is provided with upper and lower extending clips 72,74 between which an optical fiber 100 can be passed.

With the structure thus described, the sliding push mechanism 50 slides relative to drawer 22 as well as sliding relative to slide plate 54. With this structure and function, the rear wall 14 may be provided with an access opening (not shown) through which a fiber 100 is passed with the fiber entrained around the leading edge of wheel 62 between clips 74,72. The fiber is looped around brackets 38 and admitted to tray 32 for splicing.

When an operator desires to perform maintenance on a splice, the drawer 22 is pulled to the extended position shown in FIG. 1. As the drawer is pulled open, slide wheel 62 moves toward the front end of slot 56. When it reaches the end of slot 56, slide wheel 62 is pulled toward the rear of slot 61 by plate 54.

Figure 2:
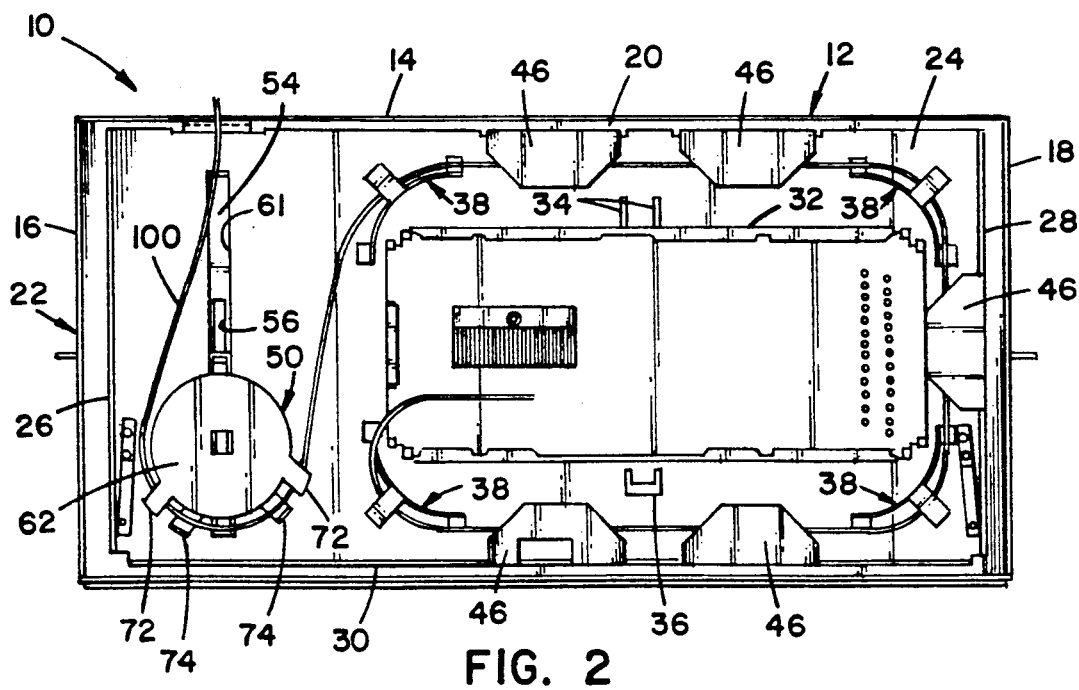
FIG. 2 is the view of FIG. 1 showing the drawer in a fully contracted position.

When the splice maintenance is completed, the operator pushes the drawer 22 back into the chassis 12 to the position shown in FIG. 2. The slide wheel 62 moves toward the rear of slot 56 and upon reaching the rear of slot 56, it is pushed by plate 54 toward the front of slot 61.

From the foregoing detailed description of the present invention, it has been shown how the objects of the invention have been attained in a preferred manner. However, modification to the equivalents of the disclosed concepts such as those which readily occur to one skilled in the art are intended to be included within the scope of this invention.

What is claimed is:

1. A splice cabinet comprising:
   a chassis;
   a plurality of drawers slidably mounted in the chassis and slidable between a first position with the drawer fully inserted within the chassis and the second position with the drawer extended from the interior of the chassis;
   each of said drawers having disposed thereon a splice tray for splicing together optical fibers;
   admitting means for admitting an optical fiber to be spliced from an exterior of a chassis into the drawer; take-up means for taking up a slack of fiber within a drawer as the drawer is moved from the first to the second position, said take-up means including a push member slidably mounted on the drawer and movable from a rear edge of a drawer toward a leading edge of the drawer.

2. A splice cabinet according to claim 1 wherein said push member is provided with a fiber engaging surface having a curvature selected with a radius of bending greater than the predetermined minimum radius.

3. A cabinet according to claim 1 wherein said push member includes a slide plate disposed beneath said drawer, said push member including a slide spool disposed above said drawer and extending through a slot in said drawer into said slide plate.

4. A cabinet according to claim 3 wherein said spool is slidably connected to said slide plate to slide in a direction of movement of said drawer as the drawer is moved between said first and second positions.

* * * * *